Patented Nov. 4, 1930

1,780,375

UNITED STATES PATENT OFFICE

THEODORE F. BRADLEY, OF WESTFIELD, NEW JERSEY, ASSIGNOR TO AMERICAN CYANAMID COMPANY, OF NEW YORK, N. Y., A CORPORATION OF MAINE

TREATING POROUS AND NONPOROUS MATERIALS

No Drawing.   Application filed November 25, 1929.   Serial No. 409,766.

This invention relates to processes of treating bodies, such as porous materials or materials having a porous surface, and relates more particularly to a treatment of such materials with new types of polybasic acid-polyhydric alcohol condensation products which are water-soluble.

Porous and non-porous bodies have previously been coated or impregnated with various materials, including resinous condensation products of polybasic acids with polyhydric alcohols. However, these resinous products are only soluble in certain organic solvents or solvent mixtures and their use in this connection with such solvents is an expensive and otherwise undesirable procedure.

It is one of the objects of the present invention to coat or impregnate in whole or in part, non-porous and porous bodies with synthetic resinous materials without necessitating the employment of organic solvents or solvent mixtures. It is a further object to treat these bodies with synthetic resins which may be dissolved in water and which may later be converted into water-insoluble resins.

I have discovered that these and other objects may be attained by treating such bodies with a water solution of a material formed by the chemical combination of a water-insoluble, resinous polyhydric alcohol-polybasic acid condensation product with a water-soluble basic material.

As described in my copending application, Serial #403,903, of which this is a continuation in part, these water-soluble resins may be prepared from a large number of substances and the details of operation may be varied in many ways. As a specific example of a resin suitable for the purposes of the present invention, the following is given merely for purposes of illustration and not in limitation:

Example A

|  | Parts by weight |
|---|---|
| 96% glycerol | 63 |
| Phthalic anhydride | 148 |
| Total | 211 |

This mixture may be heated in any suitable container, aluminum apparatus being preferable, to a temperature of from 150° to 230° C. until a sample upon cooling sets to a hard, non-sticky resin having a softening point of about 85° to 100° C., as determined by the A. S. T. M. ball and ring method, and an acid number of from 100 to 150. The exact time of heating will vary somewhat according to the temperatures employed, and the rate of heat transfer of the containing vessels. Considerable latitude in the degree of hardness, of softening point, or of acid number is permissible in the first stage of the present invention. The main limiting factor is the acid number of the resin, since if this falls too low, say, less than about 50, the resins generally cannot be rendered as soluble in water as might be desired for some commercial uses.

One phthalic glyceride resin made in accordance with this procedure was found to have an acid number of 100 and a softening point of 87.5° C. This resin was rendered water soluble in the second or B stage of the process as follows:

Example B

|  | Parts by weight |
|---|---|
| Phthalic glyceride resin A | 50 |
| Water | 100 |
| Ammonium hydroxide solution containing 46% of $NH_4OH$ | 6½ |
| Total | 156½ |

This mixture was agitated in a closed vessel at room temperature for several hours until the resin had dissolved in the water to form a clear, transparent solution. The same results were likewise obtained in a shorter period of time by effecting solution at elevated temperatures.

The B stage of the process was repeated with other portions of the phthalic glyceride resin, substituting sodium and potassium hydroxides in chemically equivalent proportions for the ammonium hydroxide, with equally good results, clear and complete solution being effected. Similar results were also obtained by substituting water-soluble organic bases, i. e. the ethanolamines, etc., for the inorganic bases.

Solution B prepared as above described, was applied by flowing it upon sheets of high-grade tissue paper. The paper was then dried at a temperature of about 80° C. for a period of about ten minutes. The paper so treated was transparent and had a high degree of flexibility. To improve water resistance, the resin absorbed by the paper was rendered completely water-insoluble by treating the impregnated paper with a solution of dilute acetic acid and then drying.

As examples of other resinous esters suitable for use in my process, which may be obtained by combining polyhydric alcohols with polybasic carboxylic acids alone, or admixed with monobasic acids, etc., the following are illustrative:

Example C

| | Parts by weight |
|---|---|
| Diethylene glycol | 106 |
| Phthalic anhydride | 148 |
| Total | 254 |

This was heated at 230° C. until a sample showed the acid number to be 99.7. An aqueous solution was effected by agitation of the following mixture at room temperature:

| | |
|---|---|
| 50 parts by weight | resinous ester |
| 100 parts by weight | water |
| 6½ parts by weight | 46% ammonium hydroxide |
| 156½ Total | |

Example D

| | Parts by weight |
|---|---|
| Succinic acid | 118 |
| 98% ethylene glycol | 62 |
| Total | 180 |

This was heated at 180° C. until a sample was quite viscous and showed an acid number of 229.5. Solution in water was effected by agitation of:

| | |
|---|---|
| 26.4 parts by weight | resin D |
| 18.2 parts by weight | water |
| 6.0 parts by weight | potassium hydroxide |
| 50.6 Total | |

This highly viscous but complete solution was effected by agitation at a temperature of 60° C.

Example E

| | Parts by weight |
|---|---|
| Glycerol 98% | 69 |
| Phthalic anhydride | 160 |
| Stearic acid | 15 |
| Total | 244 |

This was heated at 225° C. until a sample showed the acid number to be 134 and the softening point 71.5° C. Solution was effected by agitation of:

| | |
|---|---|
| 50 parts by weight of resin E | |
| 200 parts by weight of water | |
| 9.2 parts by weight of 46% ammonium hydroxide | |
| 259.2 Total | |

Example F

| | Parts by weight |
|---|---|
| Glycerol 98% | 186 |
| Phthalic anhydride | 444 |
| Linseed oil fatty acids | 210 |
| Total | 840 |

This was heated at 220-230° C. until a product was obtained having an acid number of 92.8 and a softening point of 55° C. Solution was effected by agitation of:

200 parts by weight of resin F
570 parts by weight of water
30 parts by weight of concentrated ammonium hydroxide 800 Total This solution had a viscosity of 1.40 poises at 25° C. which was found to be reduced upon the addition of more water. These solutions were found to dry quickly when applied to a surface or used as an impregnum, and subsequently became water-insoluble, even at ordinary room temperatures. Heating or baking at elevated temperatures hastens conversion into the insoluble form.

Resin F and coatings derived therefrom may be rendered softer and of increased flexibility by increasing the content of fatty acid and/or by the use of glycols to replace, partially or wholly, the glycerol.

These examples merely serve to show the wide applicability of this process of solubilization to the whole range of resinous esters which may be derived from polyhydric alcohols such as ethylene glycol and its higher homologues, di-ethylene glycol and its higher homologues, glycerol, polyglycerols, pentaerythritol, mannitol and other forms of these polyhydric alcohols when combined with polybasic carboxylic acids of both the aromatic and aliphatic groups, with and without modification by rosin or other natural resins or resin acids, fatty acids, vegetable oils or their equivalents. The water solutions may be diluted or concentrated to any desired extent.

The water-soluble products described are of value for coating or impregnating all types of non-porous or porous bodies or bodies having porous surfaces, such as metal, glass, paper, leather, wood, concrete, gypsum tiles, wall boards, textiles, fabrics, etc. These water solutions may contain a single water-soluble resin or mixtures of resins, either with or without additional materials such as casein or other adhesives or glue-like materials such as glues, gum arabic, tragacanth, etc., pigments, coloring materials and the like.

A coating process involving the use of a solution containing a water-soluble resin and casein is found to be particularly valuable for certain porous bodies. A solution was prepared by dissolving 32 parts by weight of casein in 160 parts of water and 8 parts concentrated ammonia. This solution was mixed with an equal quantity of the solution of Example C and the mixture was applied to paper by flowing and brushing. After drying at 100° C. for five minutes it was found that the paper was coated with a homogeneous, transparent and glossy film. To improve water resistance, the coated paper was dipped in 40% aqueous formaldehyde solution and dried. The formaldehyde served to regenerate the water-insoluble resin with the obvious improvement of water resistance. The proportions of resin to casein may be varied to any desired extent, although for most purposes 50 to 200% of resin based on the weight of the casein, gives best results. The greater the resin content, the more glossy the finished surface.

This method of treating paper with a solution of resin and casein is particularly valuable for the production of coated papers which are used for books, magazines, etc. In this connection, it is the customary practice to admix casein with china-clay and satin-white or other mineral fillers. Such mixtures are applied in the form of sludges, the casein having previously been rendered soluble through use of alkalis, such as sodium carbonate, borax, ammonium hydroxide, etc. However, papers coated with this mixture have been found to be but slightly resistant to moisture or excessive humidity and are also quite brittle when dry. By replacing more or less of the casein with one of my water-soluble resins, I am able to prepare coated paper suitable for the purposes mentioned and having, at the same time, excellent water resistance and sufficient flexibility. This is particularly true when the coated paper is treated to render the water-soluble resin insoluble as described, or in any one of a number of ways to be set forth.

Coatings or integral waterproofing agents for concrete and gypsum surfaces, wall plasters, plastic paints and the like are readily prepared according to the practice of my invention. Textiles or fabrics in general as well as paper may be coated and impregnated for the production of electrical insulation, containers, or wherever water and grease proof surfaces are desired. Resin F and aqueous solutions thereof are specially desirable for these purposes. Cotton fabric of appropriate structure was immersed in the solution of resin F and dried at 100° C. for a few minutes. Three coats thus applied resulted in a varnished fabric of value for electrical insulation and other purposes. Admixed with mineral fillers, compositions of this nature may be used for the impregnation of fabrics for window shades, book bindings, etc.

It is apparent that should these resins remain permanently water-soluble after coating or impregnating a porous body therewith, the commercial value of the process would in some cases be questionable. However, as has already been disclosed in several of the examples, the resin may be rendered substantially water-insoluble after use in a number of ways.

It has been found that these resins in aqueous solution may be precipitated and rendered substantially water-insoluble by the addition of water-soluble compounds of most polyvalent metals such as barium and calcium hydroxides and their salts, aluminum sulfate (alum), ferrous or ferric sulfates, chlorides, etc. Addition of such substances in theoretical proportions precipitate water-insoluble resins of great hardness which have been shown to be of the nature of metallic-glycerol-phthalates and related compounds. For instance, a process involving the coating of concrete or the like with the resin solutions, would involve a precipitation of the calcium salt of the resin during the coating or impregnating operation due to the presence of lime or similar materials in the concrete itself. It is apparent that my process has wide applicability in this connection.

Additionally, it has been observed that the ammonium ester resins may be rendered water-insoluble through appropriate baking treatments at temperatures sufficiently high to cause the elimination of at least a portion of the combined ammonia.

Likewise, as described, the ammonium ester resins are found to be precipitated and rendered water-insoluble upon the addition of formaldehyde which evidently removes the ammonia by combination to form hexamethylene tetramine. In view of this the ammonium ester resins may be admixed and used with the phenol-aldehyde and urea-aldehyde resins, the excess formaldehyde of these resins reacting with the combined ammonia of the ester resin to form hexamethylene tetramine which assists in the hardening of the resulting composite, at the same time rendering the soluble resins insoluble.

Another method for rendering the water soluble ester resins insoluble in water comprises the addition of acids to the resin solutions or to the products coated or impregnated therewith. Addition of acetic, hydrochloric and other acids was observed to cause the precipitation of the insoluble ester resins from their aqueous solutions.

It is quite apparent from the above that the present invention is susceptible of many variations as to the details of carrying out the processes as well as the nature of the products treated and the results obtained. The bodies may be treated with the solutions in any suitable manner, such as by brushing, spraying, flowing, dipping or otherwise applying the resin solution to the body or material.

It is to be understood that the invention is not limited to the specific matters set forth except as stated in the appended claims.

What I claim is:—

1. A process of treating a body which comprises applying to a surface of such body, a water solution of a water-soluble salt of a polybasic acid-polyhydric alcohol resin.

2. A process of treating a body which comprises applying to a surface of such body, a water solution of a water-soluble salt of a polybasic acid-polyhydric alcohol resin, and rendering the resinous material water-insoluble.

3. A process of treating porous materials which comprises applying to such materials, a water solution of a water-soluble salt of a polybasic acid-polyhydric alcohol resin.

4. A process of treating porous materials which comprises applying to such materials, a water solution of a water soluble salt of a polybasic acid-polyhydric alcohol resin, and rendering the resinous material water-insoluble.

5. A process of treating porous materials which comprises applying to such materials, a water solution of a water soluble salt of a polybasic acid-polyhydric alcohol resin, and rendering the resinous material water-insoluble by treatment with an acid material.

6. A process of treating porous materials which comprises applying to such materials, a water solution of a water soluble salt of a polybasic acid-polyhydric alcohol resin, and rendering the resinous material water-insoluble by treating with a solution of a polyvalent metal salt to precipitate a polyvalent metal salt of the resin.

7. A process of improving the water and grease resistance of paper which comprises coating the paper with a water solution of a water soluble salt of a resin of the polybasic acid-polyhydric alcohol type, and rendering the resin water-insoluble.

8. A process of improving the water and grease resistance of paper which comprises coating the paper with a water solution of a water-soluble salt of a resin of the polybasic acid-polyhydric alcohol type and rendering the resin water-insoluble by treatment with an acid material.

9. A process of preparing transparent paper which comprises treating thin paper with a water solution of a water-soluble salt of a resin of the polyhydric alcohol-polybasic acid type and rendering the resin water-insoluble.

10. A process of preparing transparent paper which comprises treating thin paper with a water solution of a water-soluble salt of a resin of the polyhydric alcohol-polybasic acid type and rendering the resin water-insoluble by treatment with an acid material.

11. A process of treating porous materials which comprises treating such materials with a water solution of casein and a water-soluble salt of a polybasic acid-polyhydric alcohol resin.

12. A process of treating porous materials which comprises treating such materials with a water solution of casein and a water-soluble salt of a polybasic acid-polyhydric alcohol resin, and rendering the resinous material water-insoluble.

13. A process of improving the water resistance of paper which comprises coating the paper with a water solution of casein and a water-soluble salt of a resin of the polybasic acid-polyhydric alcohol type, and rendering the resin water-insoluble.

14. A process of treating paper which comprises coating the paper with a sludge of mineral fillers suspended in a water solution of casein and a water soluble salt of a polybasic acid-polyhydric alcohol resin, and rendering the resin water insoluble.

15. A process of treating porous materials which comprises applying to such materials, a water solution of an ammonium salt of a polybasic acid-polyhydric alcohol resin.

16. A process of treating textile materials which comprises applying to such materials a water solution of an ammonium salt of a polybasic acid-polyhydric alcohol-fatty acid resin.

17. A process of treating textile materials which comprises applying to such materials a water solution of an ammonium salt of a linseed oil fatty acid-glycerol phthalate, and drying the coated material.

18. A composition of matter comprising a water solution of casein and a water-soluble salt of a polybasic acid-polyhydric alcohol resin.

19. A porous article impregnated with casein and a polybasic acid-polyhydric alcohol resinous material.

In testimony whereof, I have hereunto subscribed my name this 21st day of November, 1929.

THEODORE F. BRADLEY.

DISCLAIMER 1,780,375.—*Theodore F. Bradley*, Westfield, N. J. TREATING POROUS AND NON-POROUS MATERIALS. Patent dated November 4, 1930. Disclaimer filed February 16, 1939, by the assignee, *American Cyanamid Company*.

Hereby enters this disclaimer to claims 1, 2, 3, 4, 5, 6, 7, 8, 9, 10, and 15, with the exception that your petitioner does not disclaim the subject matter of claims 1, 2, 3, 4, 5, and 6 wherein the porous materials are restricted to materials other than paper.

[*Official Gazette March 14, 1939.*]